United States Patent [19]
Broome

[11] Patent Number: 6,079,790
[45] Date of Patent: Jun. 27, 2000

[54] BRAKE SYSTEM FOR A TRAILER VEHICLE AND A VALVE FOR USE THEREIN

[75] Inventor: William Sidney Broome, Worcestershire, United Kingdom

[73] Assignee: Haldex Brake Products Limited, United Kingdom

[21] Appl. No.: 08/981,763

[22] PCT Filed: May 13, 1997

[86] PCT No.: PCT/GB97/01275

§ 371 Date: Feb. 5, 1998

§ 102(e) Date: Feb. 5, 1998

[87] PCT Pub. No.: WO97/43155

PCT Pub. Date: Nov. 20, 1997

[30] Foreign Application Priority Data

May 14, 1996 [GB] United Kingdom ................... 9610068

[51] Int. Cl.[7] .................................................. B60T 13/74
[52] U.S. Cl. ............................. 303/3; 303/9.75; 303/123; 303/119.2; 137/625.64; 137/625.65; 251/729.03
[58] Field of Search ..................... 303/3, 9, 962, 303/123, 124, 7, 8, 15, 20, 122, 119.2, 117.1, 9.66, 9.75, 17; 137/625.64, 625.65, 625.66; 251/129.03

[56] References Cited

U.S. PATENT DOCUMENTS

| | | | |
|---|---|---|---|
| 4,575,158 | 3/1986 | Grunert et al. | 303/57 |
| 4,638,837 | 1/1987 | Buike et al. | 137/627.5 |
| 4,671,578 | 6/1987 | Rothen et al. | 303/7 |
| 4,755,008 | 7/1988 | Imoto et al. | 303/9.69 |
| 5,222,788 | 6/1993 | Dimsa et al. | 303/20 |
| 5,375,506 | 12/1994 | Hashida et al. | 91/446 |
| 5,518,031 | 5/1996 | Castel et al. | 137/627.5 |
| 5,881,768 | 3/1999 | Bezos et al. | 303/22.4 |
| 5,927,327 | 7/1999 | Bezos et al. | 303/3 |

FOREIGN PATENT DOCUMENTS

| | | | |
|---|---|---|---|
| 0 478 952 A1 | 4/1992 | European Pat. Off. | B60T 8/00 |
| 0586203 | 3/1994 | European Pat. Off. | B60T 8/00 |
| 2 270 355 | 3/1994 | United Kingdom . | |
| 2284458 | 6/1995 | United Kingdom | B60T 13/66 |
| WO94/18044 | 8/1994 | WIPO | B60T 13/68 |
| WO97/32767 | 9/1997 | WIPO | B60T 13/68 |

OTHER PUBLICATIONS

A.Schmitt: "Der Hydraulik Trainer", pp. 4,104,105, G.L. Rexroth GmbH, 1981.

*Primary Examiner*—Christopher P. Schwartz
*Assistant Examiner*—Thomas J. Williams
*Attorney, Agent, or Firm*—Leydig, Voit & Mayer, Ltd.

[57] ABSTRACT

A brake system having a combined electrically operable demand signal control valve and emergency valve comprising a first inlet connected to the supply line, a second inlet connected to the reservoir, and an outlet connectable to the fluid pressure brake operating signal inlet of the supply valve means, a valve member to control flow of fluid pressure between the second inlet and the outlet and said valve member being movable by electrical means responsive to said presence or absence of electrical supply to the system and by fluid pressure means responsive to said pressure in the supply falling below said predetermined value.

24 Claims, 2 Drawing Sheets

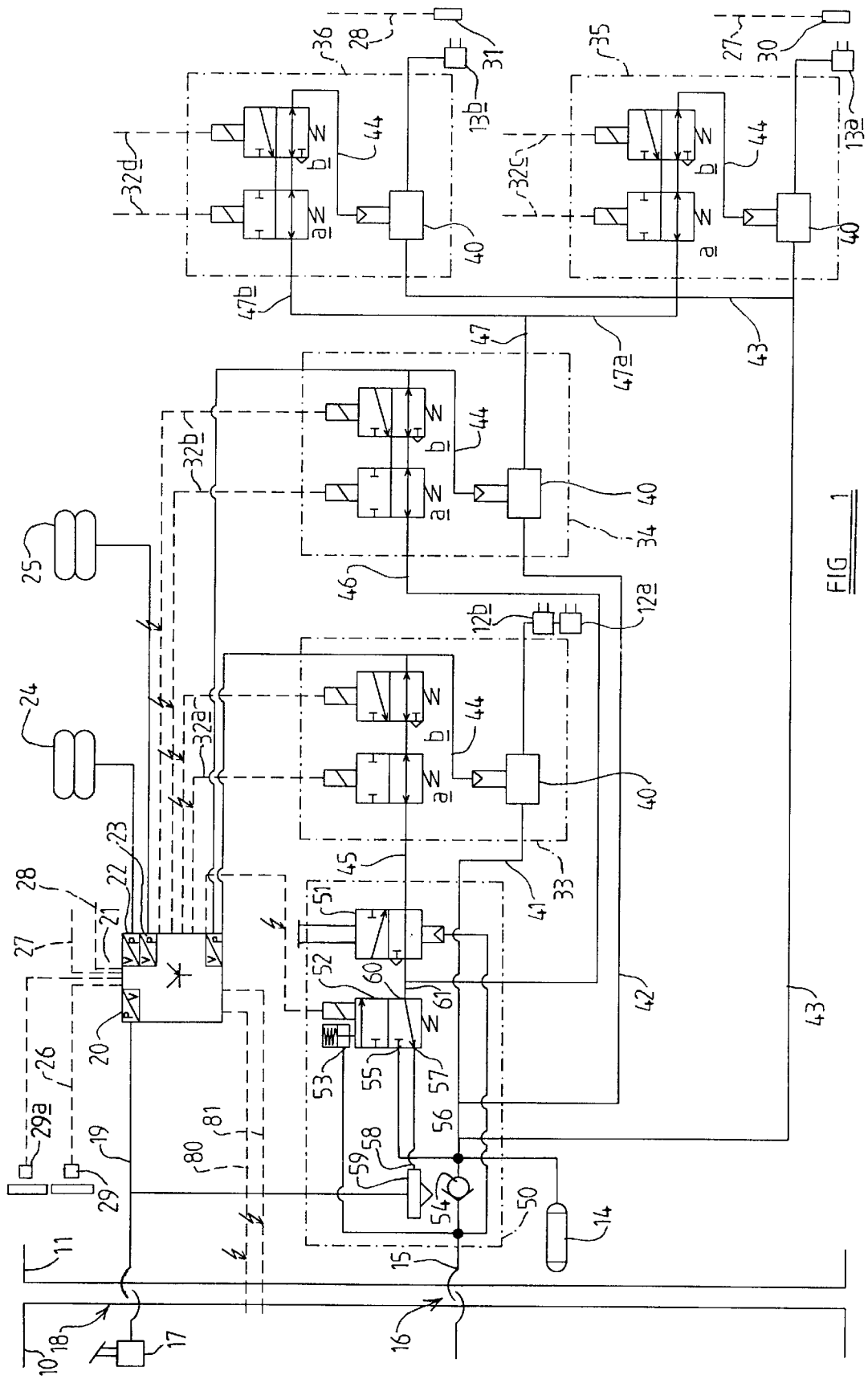
FIG — 1

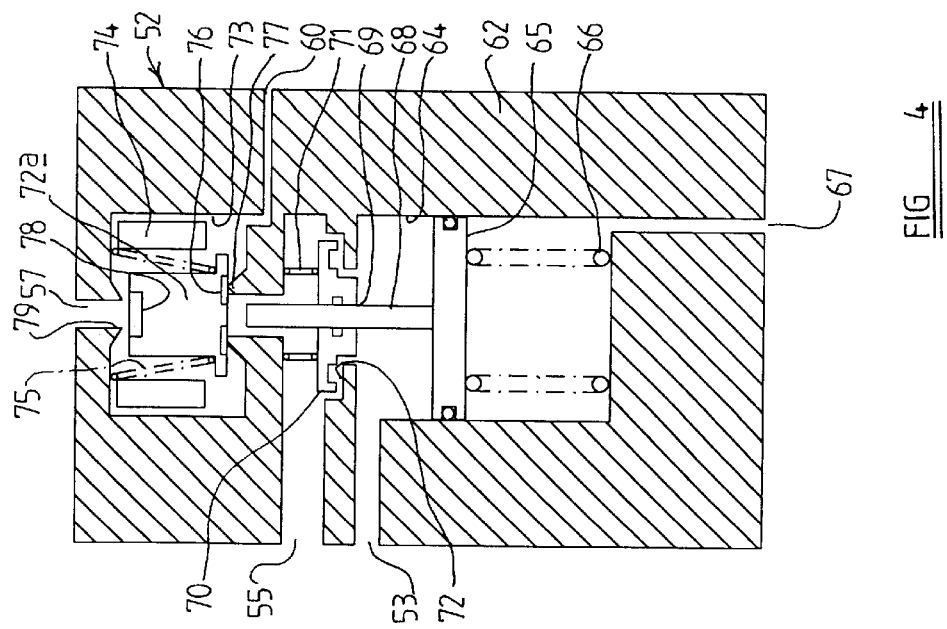
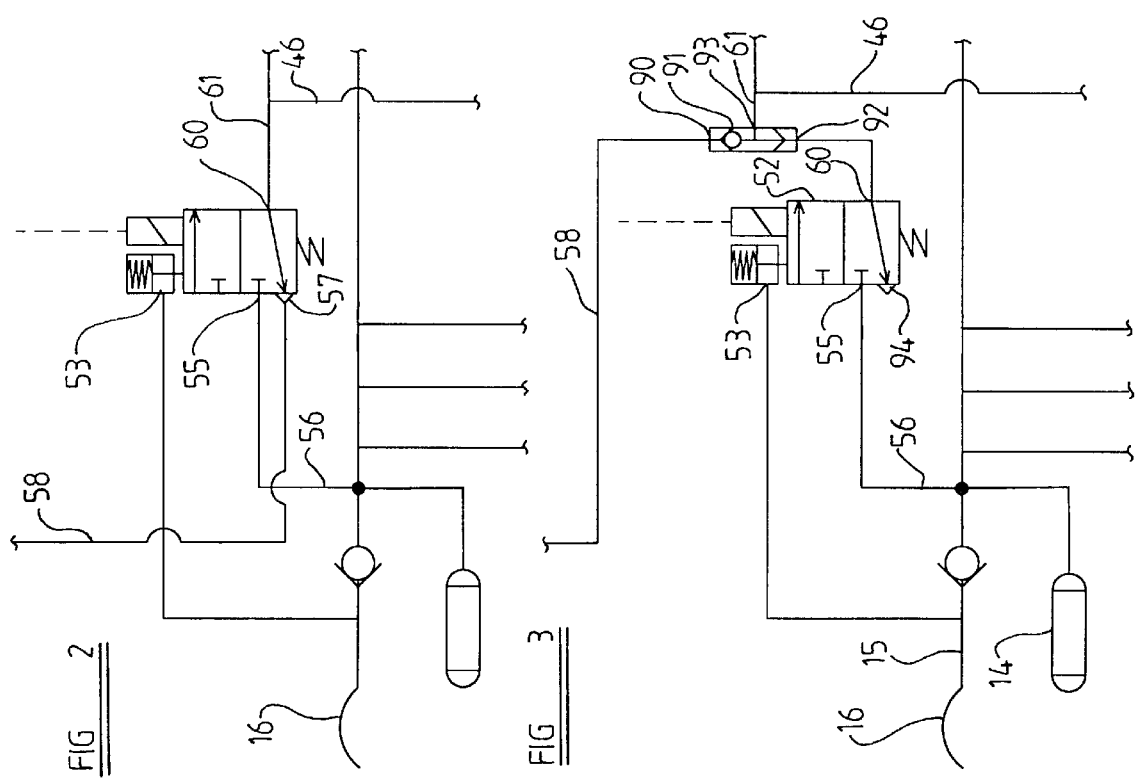

BRAKE SYSTEM FOR A TRAILER VEHICLE AND A VALVE FOR USE THEREIN

DESCRIPTION OF THE INVENTION

This invention relates to a brake system for a trailer vehicle comprising, provided on the trailer vehicle, a trailer fluid pressure supply system comprising a reservoir and a coupling connectable to a fluid pressure outlet of a tractor vehicle, transducer means responsive to a fluid pressure brake demand signal, delivered to the transducer means from a further coupling connectable to a fluid pressure brake demand signal outlet of the tractor vehicle, to provide an electrical brake demand signal; electronic control means responsive to the electrical brake demand signal to provide an electrical brake operating signal; a brake valve means responsive to said electrical brake operating signal for brake application; said brake valve means comprising a supply valve means and an electrically operable valve means having an inlet and an outlet and responsive to said electrical brake operating signal to provide, at said electrically operable valve outlet, a fluid pressure brake operating signal which is dependent on said fluid pressure brake demand signal; means to connect said electrically operable valve outlet to a fluid pressure brake operating signal inlet of the supply valve means and said supply valve means being responsive to said fluid pressure brake operating signal to supply fluid from said source to at least one actuator for brake application under a brake pressure controlled by said supply valve means in accordance with the said received fluid pressure brake operating signal and an electrically operable demand signal control valve responsive to presence or absence of electrical supply to said system respectively to prevent or to permit delivery of said fluid pressure brake demand signal to the supply valve means to provide an alternative fluid pressure brake operating signal for the supply valve means, and a pressure responsive emergency valve to connect said reservoir to the supply valve means to provide an alternative fluid pressure brake operating signal therefor when the pressure in the supply to said reservoir falls below a predetermined value. Such a brake system is referred to hereinafter as being of the kind specified.

In such a brake system the electrically operable demand signal control valve is provided as a discrete valve separate from the pressure responsive emergency valve. Accordingly, the system is relatively complex and expensive to produce.

An object of the invention is to provide a brake system of the kind specified which is less complex and more economical to produce.

According to one aspect of the present invention we provide a brake system of the kind specified having a combined electrically operable demand signal control valve and emergency valve comprising a first inlet connected to the supply line, a second inlet connected to the reservoir, and an outlet connectable to the fluid pressure brake operating signal inlet of the supply valve means, a valve member to control flow of fluid pressure between the second inlet and the outlet and said valve member being movable by electrical means responsive to said presence or absence of electrical supply to the system and by fluid pressure means responsive to said pressure in the supply falling below said predetermined value.

The combined valve may have a third inlet to which the fluid pressure brake demand signal is supplied and the outlet may be connectable to the fluid pressure brake operating signal inlet of the supply valve means.

Alternatively, the outlet of the combined valve may be connected to one inlet of a selector valve which has a second inlet to which the fluid pressure brake demand signal is supplied and an outlet connected to the fluid pressure brake operating signal inlet of the supply valve means and means to select between connection of the first inlet or the second inlet to the outlet according to the pressure difference between the first and second inlets.

The valve member may be moveable between a first position in which it prevents flow between the second inlet and the outlet and a second position in which it permits flow between the second inlet and the outlet.

When the combined valve has a third inlet, the valve member when in the first position may permit flow between the third inlet and the outlet whilst when in the second position may prevent flow between the third inlet and the outlet.

According to a second aspect of the present invention we provide a valve for use in a brake system said valve comprising a first inlet, a second inlet and an outlet, a valve member to control flow of fluid pressure between the second inlet and the outlet and said valve member being movable by electrical means and by fluid pressure means responsive to pressure at said first inlet falling below predetermined value.

The combined valve may have a third inlet.

Alternatively, the outlet of the combined valve may be connected to one inlet of a selector valve which has a second inlet and an outlet and means to select between connection of the first inlet or the second inlet to the outlet according to the pressure difference between the first and second inlets.

The valve member may be movable between a first position in which it prevents flow between the second inlet and the outlet and a second position in which it permits flow between the second inlet and the outlet.

When the combined valve has a third inlet, the valve member when in the first position may permit flow between the third inlet and the outlet whilst when in the second position may prevent flow between the third inlet and the outlet.

In either aspect of the invention:

Said electrical means may comprise a solenoid.

Said fluid pressure means may comprise a pressure responsive member, such as a piston or a diaphragm, movable in a chamber which is in communication with said first inlet so as to move in a first direction when the pressure at the first inlet falls below a predetermined pressure and there being an element movable with the pressure responsive member to cause movement of the valve member.

Said element may be adapted to move the valve member to said second position on movement of the element in said first direction.

Said element may be permitted to move away from the valve member as a result of movement of the element in the opposite direction.

A non-return valve means may be provided to permit flow between the first inlet and the second inlet and prevent flow from the second inlet to the first inlet.

An embodiment of the invention will now be described by way of example with reference to the accompanying drawings wherein FIG. 1 is a circuit diagram of a brake system embodying the invention, FIG. 2 is a fragmentary circuit diagram showing an alternative configuration for part of the circuit diagram of FIG. 1

FIG. 3 is a fragmentary circuit diagram showing a further alternative configuration for part of the circuit to FIG. 1, and FIG. 4 is a diagrammatic cross-sectional view through a valve for use with the system of FIG. 1.

Referring to the drawings, a tractor vehicle is shown at 10 and a trailer at 11. The trailer is a conventional full trailer having a front axle with wheels at opposite ends thereof and a rear axle, again with wheels at opposite ends thereof.

The wheels on the front axle each have a brake, the brakes being operated by brake actuators 12a, 12b respectively.

The rear wheels also each have a brake, the brakes being operated by a brake actuator 13a and a brake actuator 13b. The brake actuators 12a 12b, and 13a, 13b are responsive to brake pressure, in the present example compressed air, supplied thereto as hereinafter to be described by the brake system.

The brake system also has a reservoir 14 and air is supplied to the reservoir by a main air supply line 15 which is provided with suitable couplings 16 between the tractor and the trailer. A fluid pressure brake demand signal is generated on the tractor by the operator's brake pedal 17 in conventional manner and is fed by suitable couplings 18 and a fluid pressure brake demand signal supply line 19 to a pressure transducer 20 associated with an electronic control unit 21 but which may be provided separate therefrom at a desired location and connected to the control unit 21 via an electrical line. The transducer 20 is responsive to the fluid pressure brake demand signal provided on the line 19 and supplies a corresponding electrical brake demand signal to the controller 21. The controller 21 provides an electrical brake operating signal on electrical lines 32a and 32b to two electro-pneumatic relay valves (EPRV) 33 and 34.

The controller 21 is also associated with two further pressure transducers 22, 23 which are responsive to pressure from a front air suspension 24 and a rear air suspension 25 of the vehicle so that the controller is responsive to variation in load imposed on the front and rear suspensions. The controller 21 is also provided with electrical signals on lines from wheel speed sensors 29–29a-30-31 associated with each of the front wheels and each of the rear wheels respectively.

Accordingly, the controller 21 provides electrical brake operating signals on electrical lines 32a and 32b in accordance with driver brake demand as indicated by the fluid pressure brake demand signal modulated as necessary according to the programming of the electronic control unit by the load imposed from the front and rear suspensions 24, 25 and by skid conditions of the wheels of the front axle or each of the wheels of the rear axle sensed by the speed sensors 29, 29a, 30, 31.

The EPRV 33 supplies brake pressure to both of the actuators, 12a, 12b, of the front axle.

The EPRV 33 provides brake pressure to the actuators 12a, 12b which is modulated not only in accordance with anti-skid requirements but also in accordance with the front axle load of the trailer.

The controller 21 also provides on lines 32b an electrical brake operating signal to the EPRV 34 which modulates the pressure fed therefrom only in accordance with the rear axle load of the trailer.

The controller 21 also provides an electrical brake operating signal to the ABS valve 35 on line 32c and a separate electrical brake operating signal on line 32d to the ABS valve 36. The brake pressure supplied to the actuators 13a, 13b respectively is modulated by the associated ABS valves 35, 36 in accordance with anti-skid requirements. By providing the ABS 35, 36 which provide anti-skid control closely adjacent to the associated actuators 13a, 13b delay in providing anti-skid control is avoided, hence, the desirability of separating the anti-skid modulation from the load dependent modulation which is provided by the EPRV 34.

Each EPRV 33–34 and ABS valves 35–36 is similar and comprises an electrically operable valve means and a supply valve means. The supply valve means, in this example comprises a conventional relay valve 40 to which main air supply is fed from the reservoir 14 on a respective line 41–43. The magnitude of the air pressure at the exit port of each relay valve 40 is modulated by the relay valve in accordance with a fluid pressure brake operating signal fed to the relay valve on line 44 from the electrically operable valve means which comprises a pair of solenoid valves a, b. Air is fed to the solenoid valves a–b of each EPRV 33–34 and ABS valves 35–36 on lines 45, 46, 47a and 47b respectively.

The lines 47a and 47b branch from a line 47 which is connected to the output of the relay valve 40 of the EPRV 34. Hence the fluid pressure brake operating signal fed on the lines 44 to the relay valves 40 of the ABS valves 35 and 36 is, at all times, air which has been supplied from the reservoir 14 on line 42 via the EPRV 34.

In the case of the EPRV's 33, 34 the fluid pressure brake operating signal may be supplied from the reservoir 14 or may be supplied from the fluid pressure brake demand signal depending upon the operating condition of the brake system as hereafter to be described.

To this end, the brake system is provided with an emergency supply valve (ESV) 50 which, in the present example, includes a manoeuvring valve 51 of conventional kind connected in series only with the EPRV 33 for the brakes of the front axle. Since the manoeuvring valve operates in a conventional manner further discussion thereof is not necessary.

The ESV 50 includes a combined electrically operable and pressure operable valve which provides a demand signal control valve and an emergency valve operable in the event of failure in pressure supply to the brake system on line 15. The combined valve is indicated generally at 52 and has a first inlet 53 connected to the main supply line 15 upstream of a one-way check valve 54 which is disposed upstream of the reservoir 14 so as to prevent air from reservoir 14 and the remainder of the brake system downstream of the check valve 54 exhausting to atmosphere in the event of failure in the pipe 15 or upstream thereof.

The valve 52 has a second inlet 55 which is connected by a line 56 to the reservoir 14. A third inlet port 57 of the value 52 is connected by a line 58 incorporating a quick release one-way exhaust valve 59 to the fluid pressure brake demand signal supply line 19. An outlet port 60 of the valve 52 is connected by line 61 to the line 45 and to the line 46 which provides an input to the solenoid valves a, b of the EPRV's 33, 34.

As best shown in FIG. 4 the valve 52 comprises a valve body 62 in which the first to third inlet ports 53, 55, 57 and outlet port 60 are provided. The first inlet port 53 communicates with a first chamber 64 in which a piston 65 is slidably mounted the piston being biased by a coil compression spring 66 upward, as viewed in FIG. 4 in a first direction.

The part of the chamber 64 below the piston 65 is connected to atmosphere through an exhaust port 67. The piston 65 has a piston rod 68 which passes through a passage 69 in a one-way valve member 70 which is biased by coil compression springs 71 into engagement with a valve seat 72 so as to prevent communication between the second inlet port and the first inlet port whilst permitting communication between the first inlet port and the second inlet port when the pressure differential therebetween overcomes the bias of the spring 71. If desired, any other pressure responsive member may be provided, such as a diaphragm.

The piston rod 68 is adapted to engage a valve member 72a which is movably mounted in a second chamber 73. The valve member 72A comprises the armature of a solenoid the coil of which is indicated at 74 and the valve 72a is normally biased downwardly in FIG. 4 by a coil compression spring 75 to a first position. At its lower end the valve member 72a is provided with a sealing member 76 for sealing engagement with a valve seat 77 to obstruct flow of air from the second inlet port 55 into the chamber 73. At its upper end the valve member 72 is provided with a further sealing member 78 for sealing engagement with a second valve seat 79 to prevent communication between the third inlet port 57 and the chamber 73 when the valve member 72 is in a second position. The chamber 73 is in constant communication with the outlet port 60.

In use, during normal operation when air under pressure is supplied from the tractor 10 by the couplings 16 to the supply line 15 at normal pressure and when a normal electrical supply is provided to the brake system, i.e. a permanent supply such as ISO 7638 on line 80 or stop lightpower according to ISO 1185 on line 81 the system operates as follows. In the presence of electrical supply when the driver demands the application of the brakes the transducer 20 monitors the magnitude of the fluid pressure brake demand signal on the line 19 and causes the solenoid coil 74 to be energised to move the valve member 72a to the second position to block the passage of the brake pressure demand signal from the third inlet 57 to the outlet 60 and to permit flow of air from the reservoir 14 via line 56 and second inlet port 55 to the outlet 60. Thus reservoir air is supplied on lines 45 and 46 to the solenoid valves a, b of the EPRV's 33, 34 to provide a brake pressure operating signal to associated the relay valve 40 thereby modulating the reservoir pressure on the lines 41 and 42 to provide the desired brake pressure. In the event of anti-skid operation in respect of the front axle the valves a, b of the EPRV 33 modulate the air supply line 45 to accordingly provide brake pressure which is modulated for ABS control. The solenoid valves A, B of the EPRV 34 similarly modulate the air from the reservoir 14 in the line 46 in accordance with the rear axle load of the trailer.

The output from the EPRV 34 is fed on lines 47a, 47b to provide the control input air for the solenoid valves a, b of the ABS valves 35, 36 which modulate the control pressure in accordance with anti-skid control to provide an appropriately modulated brake pressure to the actuators 13a, 13b.

In the event of failure of electrical supply during brake application, the valve member 72a will remain in the first position shown in FIG. 4 under the bias of the spring 75 so that reservoir air from reservoir 14 supplied to the inlet port 55 will be blocked from flow to the outlet 60 whilst the fluid pressure brake demand signal will alternatively be fed from the third inlet 57 to the outlet 60 and thus provide the control air on lines 45, 46 to the control solenoids, a, b to the EPRV valves 33, 34. Since the electrical system is inoperative, these valves will remain in their first spring biased position illustrated in FIG. 1 and will pass the fluid pressure brake demand signal therethrough to provide a control signal to their associated relay valves. Otherwise, operation is as described before.

In the event of failure of pressure in the main supply line 15 upstream of the check valve 54 the reduced pressure acting on the piston 65 is insufficient to overcome the biasing effect of the spring 66 so that the piston rod 68 will be moved upwardly to move the valve member 72a from the first position shown in FIG. 4 so as to block the supply of fluid pressure brake demand signal from the third inlet port 57 and to permit reservoir air at the second inlet 55 to be fed to the outlet 60 and thus to provide the source of control air to the solenoid valves a, b of the EPRV's 33, 34 and thereby apply the brakes. In the event that electrical supply is maintained then such brake application is under the load and anti-skid modulation control provided by the control unit 20 as described herebefore. If the electrical supply has failed as well as the pressure supply the reservoir air is fed directly, without modulation, to the control side of the relay valves 40 of the EPRV's 33, 34 and hence reservoir air is fed, without modulation, to provide the control air for the solenoid valves A, B of the ABS valves 35, 36 so that, again, reservoir air is fed by the solenoid valves, without modulation, to the actuators 13a, 13b.

Although the solenoid valves A and B are configured as described and illustrated hereinbefore, if desired the solenoid valves may be alternatively configured so as to provide control pressure supply, hold and exhaust modes in conventional manner.

Referring now to FIG. 2, an alternative configuration for the ESV illustrated. In this modification the arrangement is essentially the same as that described hereinbefore except for the absence of quick release valve 59 which is optionally provided in the arrangement of FIG. 1 so that, if necessary, a quick release of pressure can be provided thereby.

FIG. 3 shows a further modification in which the fluid pressure brake demand signal, instead of being fed into the third port 57, is fed to a first inlet 90 of a selector valve 91 such as a shuttle valve, having a valve member movable in dependence on the pressure difference between the inlets to select between connecting the first inlet or the second inlet to the outlet. The second inlet 92 of the shuttle valve is connected to the outlet 60 (of course, in this embodiment no inlet corresponding to the third inlet 57 of the previously described embodiments is provided). An outlet 93 of the selector valve 91 is connected to line 61 and in other respects the device is as described previously.

In use, when electrical supply is present the modified valve 52 when energised permits reservoir air to pass to the second inlet 92 to close the first inlet 90 of the selector valve 91 so that reservoir air is fed to line 61 and hence downstream thereof as described in connection with the first embodiment.

When electrical supply fails the modified valve 52 will revert to the position shown in FIG. 3 so that reservoir 14 is blocked and the second inlet 92 is connected to exhaust as shown at 94. As a result, the fluid pressure brake demand signal supplied to the first inlet 90 on line 58 will be fed to line 61 and hence downstream thereof so that the system operates in the same way as described hereinbefore in connection with FIG. 1. It will be appreciated that in FIG. 3 the modified valve 52 achieves the same function as the valve 52 described in connection with FIGS. 1 and 2 but relies upon the presence of the selector valve 91 rather than controlling the supply of fluid pressure brake demand signal directly by the valve member 72.

If desired, the hereabove described brake systems may be utilised in a semi-trailer having only a rear axle. In this case the EPRV 33 feeds brake pressure to a brake actuator for one of the wheels of the rear axle whilst the EPRV 34 feeds brake pressure to the actuator for the other wheel of the rear axle.

The controller 21 is programmed so as to provide load sensitive and anti-skid control for both EPRV's. The ABS valves 35 and 36 are not provided.

The features disclosed in the foregoing description, or the accompanying drawings, expressed in their specific forms or in terms of a means for performing the disclosed function, or a method or process for attaining the disclosed result, or a class or group of substances or compositions, as appropriate, may, separately or in any combination of such features, be utilised for realising the invention in diverse forms thereof.

I claim:

1. A brake system for a trailer vehicle comprising, provided on the trailer vehicle, a trailer fluid pressure supply system comprising a reservoir and a coupling connectable to a fluid pressure outlet of a tractor vehicle, transducer means responsive to a fluid pressure brake demand signal, delivered to the transducer means from a further coupling connectable to a fluid pressure brake demand signal outlet of the tractor vehicle, to provide an electrical brake demand signal; electronic control means responsive to the electrical brake demand signal to provide an electrical brake operating signal; a brake valve means responsive to said electrical brake operating signal for brake application; said brake valve means comprising a supply valve means and an electrically operable valve means having an inlet and an outlet and responsive to said electrical brake operating signal to provide, at said electrically operable valve outlet a fluid pressure brake operating signal which is dependent on said fluid pressure brake demand signal; means to connect said electrically operable valve outlet to a fluid pressure brake operating signal inlet of the supply valve means and said supply valve means being responsive to said fluid pressure brake operating signal to supply fluid from said source to at least one actuator for brake application under a brake pressure controlled by said supply valve means in accordance with the said received fluid pressure brake operating signal and an electrically operable demand signal control valve responsive to presence or absence of electrical supply to said system respectively to prevent or to permit delivery of said fluid pressure brake demand signal to the supply valve means to provide an alternative fluid brake operating signal for the supply valve means, and a pressure responsive emergency valve to connect said reservoir to the supply valve means to provide an alternative fluid pressure brake operating signal therefor when the pressure in the supply to said reservoir falls below a predetermined value, said brake system having a combined electrically operable demand signal control valve and emergency valve comprising a first inlet connected to the supply line, a second inlet connected to the reservoir and an outlet connectable to the fluid pressure brake operating signal inlet of the supply valve means, a valve member to control flow of fluid between the second inlet and the outlet and said valve member being moveable by electrical means responsive to said presence or absence of electrical supply to the system and by fluid pressure means responsive to said pressure in the supply falling below said predetermined value.

2. A brake system according to claim 1 where the combined valve has a third inlet to which the fluid pressure brake demand signal is supplied.

3. A brake system according to claim 2 where the outlet is connected to the fluid pressure brake operating signal inlet of the supply valve means.

4. A brake system according to claim 3 wherein the valve member is moveable between a first position in which it prevents flow between the second inlet and the outlet and a second position in which it permits flow between the second inlet and the outlet.

5. A brake system according to claim 4 where the valve member when in the first position may permit flow between the third inlet and the outlet whilst when in the second position may prevent flow between the third inlet and the outlet.

6. A brake system according to claim 1 where the outlet of the combined valve is connected to one inlet of a selector valve which has a second inlet to which the fluid pressure brake demand signal is supplied and an outlet connected to the fluid pressure brake operating signal inlet of the supply valve means and means to select between connection of the first inlet or the second inlet to the outlet according to the pressure difference between the first and second inlets.

7. A brake system according to claim 6 wherein the valve member is moveable between a first position in which it prevents flow between the second inlet and the outlet and a second position in which it permits flow between the second inlet at the outlet.

8. A brake system according to claim 1 where said electrical means comprises a solenoid.

9. A brake system according to claim 1 wherein said fluid pressure means comprises a pressure responsive member moveable in a chamber which is in communication with said first inlet so as to move in a first direction when the pressure at the first inlet falls below a predetermined pressure and there being an element moveable with the pressure responsive member to cause movement of the valve member.

10. A brake system according to claim 9 where the pressure responsive member is a piston.

11. A brake system according to claim 9 where said element is able to move the valve member to said second position on movement of the element in said first direction.

12. A brake system according to claim 11 where said element is permitted to move away from the valve member as a result of movement of the element in the opposite direction.

13. A brake system according to claim 1 wherein a non-return valve means is provided to permit flow between the first inlet and the second inlet and prevent flow from the second inlet to the first inlet.

14. A valve for use in a brake system said valve comprising a first inlet, a second inlet and an outlet, a valve member to control fluid pressure between the second inlet and the outlet, and said valve member being movable by electrical means and by fluid pressure means, said valve member being biased to a first position in which it prevents fluid flow between the second inlet and the outlet and being movable by said fluid pressure means to a second position in which it permits fluid flow between said second inlet and said outlet, said fluid pressure means being operable to move said valve member in response to pressure at said first inlet falling below a predetermined value.

15. A valve according to claim 14 wherein the valve member is movable between the first position and the second position by said electrical means.

16. A valve according to claim 15 where the outlet of the valve is connected to one inlet of a selector valve which has a second inlet and an outlet and means to select between connection of the first inlet of second inlet to the outlet according to the pressure difference between the first and second inlets.

17. A valve according to claim 15 where the valve has a third inlet.

18. A valve according to claim 17 where the valve member when in the first position may permit flow between the third inlet and the outlet and when in the second position may prevent flow between the third inlet and the outlet.

19. A valve according to claim 14 where said electrical means comprises a solenoid.

20. A valve system according to claim 14 where said fluid pressure means comprises a pressure responsive member moveable in a chamber which is in communication with said first inlet so as to move in a first direction when the pressure at the first inlet falls below a predetermined pressure and there being an element moveable with the pressure responsive member to cause movement of the valve member.

21. A valve according to claim 20 where the pressure responsive member is a piston.

22. A valve according to claim 20 where said element is able to move the valve member to said second position on movement of the element in said first direction.

23. A valve according to claim 22 where said element is permitted to move away from the valve member as a result of movement of the element in the opposite direction.

24. A valve according to claim 14 wherein a non-return valve means is provided to permit flow between the first inlet and the second inlet and prevent flow from the second inlet to the first inlet.

\* \* \* \* \*